United States Patent
Cho et al.

(10) Patent No.: US 8,355,374 B2
(45) Date of Patent: Jan. 15, 2013

(54) METHOD FOR SIGNALING UPLINK SYSTEM CONFIGURATION INFORMATION

(75) Inventors: Han Gyu Cho, Anyang-si (KR); Jin Soo Choi, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 299 days.

(21) Appl. No.: 12/863,909

(22) PCT Filed: Mar. 31, 2009

(86) PCT No.: PCT/KR2009/001626
§ 371 (c)(1),
(2), (4) Date: Jul. 21, 2010

(87) PCT Pub. No.: WO2009/123410
PCT Pub. Date: Oct. 8, 2009

(65) Prior Publication Data
US 2010/0296479 A1    Nov. 25, 2010

Related U.S. Application Data

(62) Division of application No. 61/040,724, filed on Mar. 31, 2008.

(51) Int. Cl.
*H04Q 7/28* (2006.01)
*H04J 3/00* (2006.01)
*H04J 3/16* (2006.01)

(52) U.S. Cl. ......... 370/329; 370/344; 370/345; 370/465

(58) Field of Classification Search .................. 370/329, 370/341, 344, 345, 465
See application file for complete search history.

(56) References Cited

U.S. PATENT DOCUMENTS

| | | | |
|---|---|---|---|
| 2004/0174839 A1* | 9/2004 | Lopes | 370/328 |
| 2004/0252659 A1* | 12/2004 | Yun et al. | 370/328 |
| 2005/0141450 A1* | 6/2005 | Carlton et al. | 370/329 |
| 2005/0141475 A1 | 6/2005 | Vijayan et al. | |
| 2006/0109931 A1* | 5/2006 | Asai et al. | 375/299 |
| 2007/0066362 A1 | 3/2007 | Ma et al. | |
| 2007/0248043 A1* | 10/2007 | Afrashteh et al. | 370/329 |
| 2007/0268812 A1 | 11/2007 | Yoon et al. | |
| 2008/0075106 A1* | 3/2008 | Mcdonald et al. | 370/442 |
| 2009/0161591 A1* | 6/2009 | Ahmadi et al. | 370/312 |
| 2009/0225881 A1* | 9/2009 | Moon et al. | 375/260 |
| 2009/0304120 A1* | 12/2009 | Agrawal et al. | 375/340 |
| 2011/0064007 A1* | 3/2011 | Wang | 370/280 |
| 2011/0211501 A1* | 9/2011 | Giallorenzi et al. | 370/280 |

* cited by examiner

*Primary Examiner* — Andrew Lee
(74) *Attorney, Agent, or Firm* — McKenna Long & Aldridge LLP

(57) ABSTRACT

A method for transmitting system configuration information about uplink multiplexing of a 16m mobile station (MS) and a 16e MS is disclosed. The method comprises transmitting the system configuration information every super frame comprised of a plurality of radio frames. The system configuration information comprises an uplink configuration of time division multiplexing (TDM) and frequency division multiplexing (FDM) of the 16m MS and the 16m MS for each of the plurality of radio frames.

14 Claims, 6 Drawing Sheets

METHOD FOR SIGNALING UPLINK SYSTEM CONFIGURATION INFORMATION

This application is a national phase application based on International Application No. PCT/KR2009/001626, filed on Mar. 31, 2009, which claims priority to U.S. Provisional Application No. 61/040,724, filed on Mar. 31, 2008, all of which are incorporated by reference for all purposes as if fully set forth herein.

TECHNICAL FIELD

The present invention relates to a method for signaling uplink system configuration information, particularly for a new system (e.g., IEEE Standard 802.16m) supporting a legacy system (e.g., IEEE Standard 802.16e).

BACKGROUND ART

Among fundamentals of basic concepts of communication theory, a few things necessary for a description of the present invention will now be explained.

In this document, the new system indicates a communication system which is designed to support the legacy system, especially to support the mobile station (MS) of the legacy system. Therefore, it can be the cases that the MSs of the new system and the MSs of the legacy system communicate with the base station of the new system. For example, the base station of IEEE Standard 802.16m (hereinafter '16 m') system may have to support at least one MS of the 16m system and at least one MS of IEEE Standard 802.16e (hereinafter '16e') system in a single frame.

In telecommunications and computer network, multiplexing (known as muxing) is a process where multiple analog message signals or digital data streams are combined into one signal over a shared medium. The aim is to share an expensive resource. For example, in telecommunications, several phone calls may be transferred using one wire.

The multiplexed signal is transmitted over a communication channel, which may be a physical transmission medium. The multiplexing divides the capacity of the low-level communication channel into several higher-level logical channels, one for each message signal or data stream to be transferred. A reverse process, known as demultiplexing, can extract the original channels on the receiver side.

The two most basic forms of multiplexing are time-division multiplexing (TDM) and frequency-division multiplexing (FDM), both either in analog or digital form. FDM requires modulation of each signal.

An uplink (UL or U/L) is the portion of a communication link used for the transmission of signals. Pertaining to GSM (Global System for Mobile communications) and cellular networks, the radio uplink is the transmission path from the Mobile Station (Cell Phone) to a Base Station (Cell Site). An uplink is the inverse of a downlink. Pertaining to cellular networks, the radio downlink is the transmission path from a Base Transceiver Station (Cell Site) to the Mobile Station (Cell Phone).

At least on of TDM and FDM can be taken into consideration when multiplexing MSs of the new system and MSs of the legacy system in a single frame.

For an uplink communication, FDM is advantageous for a MS of the legacy system in that cell coverage of the legacy system and throughput of a cell-edge located user of the legacy system are maintained, whereas TDM has an advantage that the design flexibility of the new system can be maximized.

A cellular network is a radio network made up of a number of radio cells (or just cells) each served by a fixed transmitter, known as a cell site or base station. These cells are used to cover different areas in order to provide radio coverage over a wider area than the area of one cell. Cellular networks are inherently asymmetric with a set of fixed main transceivers each serving a cell and a set of distributed (generally, but not always, mobile) transceivers which provide services to the network's users.

Cellular networks offer a number of advantages in terms of capacity, power usage, and coverage over alternative solutions.

The increased capacity in a cellular network, compared with a network with a single transmitter, comes from the fact that the same radio frequency can be reused in a different area for a completely different transmission. If there is a single plain transmitter, only one transmission can be used on any given frequency. Unfortunately, there is inevitably some level of interference from the signal from the other cells which use the same frequency. This means that, in a standard FDMA system, there must be at least a one cell gap between cells which reuse the same frequency.

The frequency reuse factor is the rate at which the same frequency can be used in the network. It is 1/K (or K according to some books) where K is the number of cells which cannot use the same frequencies for transmission. Common values for the frequency reuse factor are 1/3, 1/4, 1/7, 1/9 and 1/12 (or 3, 4, 7, 9 and 12 depending on notation).

In case of N sector antennas on the same base station site, each with different direction, the base station site can serve N different sectors. N is typically 3. A reuse pattern of N/K denotes a further division in frequency among N sector antennas per site. Some current and historical reuse patterns are 3/7 (North American AMPS), 6/4 (Motorola NAMPS), and 3/4 (GSM).

If the total available bandwidth is B, each cell can only utilize a number of frequency channels corresponding to a bandwidth of B/K, and each sector can use a bandwidth of B/NK.

For a multi-cell configuration, each cell may adopt different multiplexing scheme for the same time frame, that is, one cell may use TDM for a frame and another cell adjacent to the one cell may use FDM for the same frame. In this case, inter-cell-interference may occur such that system performance decreases. Therefore, it is necessary to take inter-cell-interference into consideration when designing multiplexing of the MSs of the new system and the MSs of the legacy system.

In addition, a BS in a cell may need to broadcast, for each frame, information about which one among TDM and FDM is used for uplink transmission to the MSs located in the cell. The MSs may use the broadcast information for subcarrier mapping.

DISCLOSURE OF INVENTION

Technical Problem

An object of the present invention is to provide a method for efficiently signaling system configuration information for a system supporting legacy communication system.

Technical Solution

In an aspect of the invention, there is a method of transmitting system configuration information in a wireless mobile communication system supporting uplink multiplexing of a first type mobile station (MS) and a second type mobile station (MS). The method comprises transmitting, at a base station of a cell, the system configuration information at a period of a time length of a first frame, the first frame comprised of a plurality of second frames. The system configuration information comprises an uplink configuration of time division multiplexing (TDM) and frequency division multiplexing (FDM) of the first type MS and the second type MS for each of the plurality of second frames.

Preferably, the time length of the first frame is 20 ms, and the first frame is comprised of four (4) of the second frames each of which is 5 ms in time length.

Preferably, the system configuration information further comprises a ratio of an amount of resources for the first type MS to an amount of resources for the second type MS for each one of the plurality of second frames.

Preferably, the ratio of the amount of resources for the first type MS to the amount of resources for the second type MS is set to a single value for all of the second frames in the first frame.

Preferably, the single value is independently set for each of the first frames.

Preferably, the ratio of the amount of resources for the first type MS to the amount of resources for the second type MS is set to a first value for all second frames allocated for FDM in the first frame, and the ratio of the amount of resources for the first type MS to the amount of resources for the second type MS is set to a second value for all second frames allocated for TDM in the first frame.

Preferably, the uplink configuration is represented by a bitmap format.

Preferably, the system configuration information is represented in a table form.

Preferably, the system configuration information is transmitted at a period of a multiple of a time length of the first frame.

Preferably, the system configuration information is transmitted to a mobile station in a cell including the base station.

Preferably, wireless mobile communication system is a cellular system, and the system configuration information is transmitted to a network entity of another cell.

Preferably, the system configuration information further comprises downlink-to-uplink resource ratio in the first frame, and the downlink-to-uplink resource ratio is represented by ceil(log 2(n1)) bits when the second frame is comprised of n1 number of third frames.

Preferably, if the downlink-to-uplink resource ratio is given to x:y, the uplink configuration of time division multiplexing (TDM) of the first type MS and the second type MS of a second frame is represented by ceil(log 2(n2*y/(x+y)) bits when the uplink area of the second frame is comprised of n2 number of third frames.

In another aspect, there is a method for transmitting system configuration information in a wireless mobile communication system supporting uplink multiplexing of a first type mobile station (MS) and a second type mobile station (MS). The method comprises transmitting, at a base station, the system configuration information at a period of a time length of a first frame, wherein the system configuration information comprises an uplink configuration of time division multiplexing (TDM) and frequency division multiplexing (FDM) of the first type MS and the second type MS for the first frame, and the time length of the first frame is 5 ms.

Preferably, the system configuration information is written in UP-MAP field of the first frame.

Preferably, the first type mobile station is an IEEE Standard 802.16e mobile station, and the second type mobile station is an IEEE Standard 802.16m mobile station. The first frame is a super frame, the second frame is a frame and the third frame is a subframe defined in IEEE Standard 802.16m.

Advantageous Effects

Uplink TDM/FDM configuration is efficiently transmitted to mobile stations located in a cell when the cell is served by a base station which support a legacy mobile station.

BRIEF DESCRIPTION OF DRAWINGS

The accompanying drawings, which are included to provide a further understanding of the invention, illustrate embodiments of the invention, and serve to explain the principle of the invention together with the description.

In the drawings.

MODE FOR THE INVENTION

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The following description provides specific details for a thorough understanding of embodiments of the invention. However, one skilled in the art will understand that the invention may be practiced without these details. In other instances, well-known structures and functions have not been described in detail or may be shown in block diagram form to avoid unnecessarily obscuring the description of embodiments of the invention. Wherever possible, the same reference numbers will be used throughout the drawings to refer to the same or like parts.

The following embodiments are proposed by combining constituent components and characteristics of the present invention. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. Some components or characteristics of any embodiment may also be included in other embodiments, or may be replaced with those of the other embodiments as necessary. It is obvious to those skilled in the art that the above embodiments may be constructed by combining claims having no explicit citation relations or new claims may also be added by the amendment to be made after the patent application.

Hereinafter, 16m system is referred to as a new system, and 16e system is referred to as a legacy system.

Figure 1:
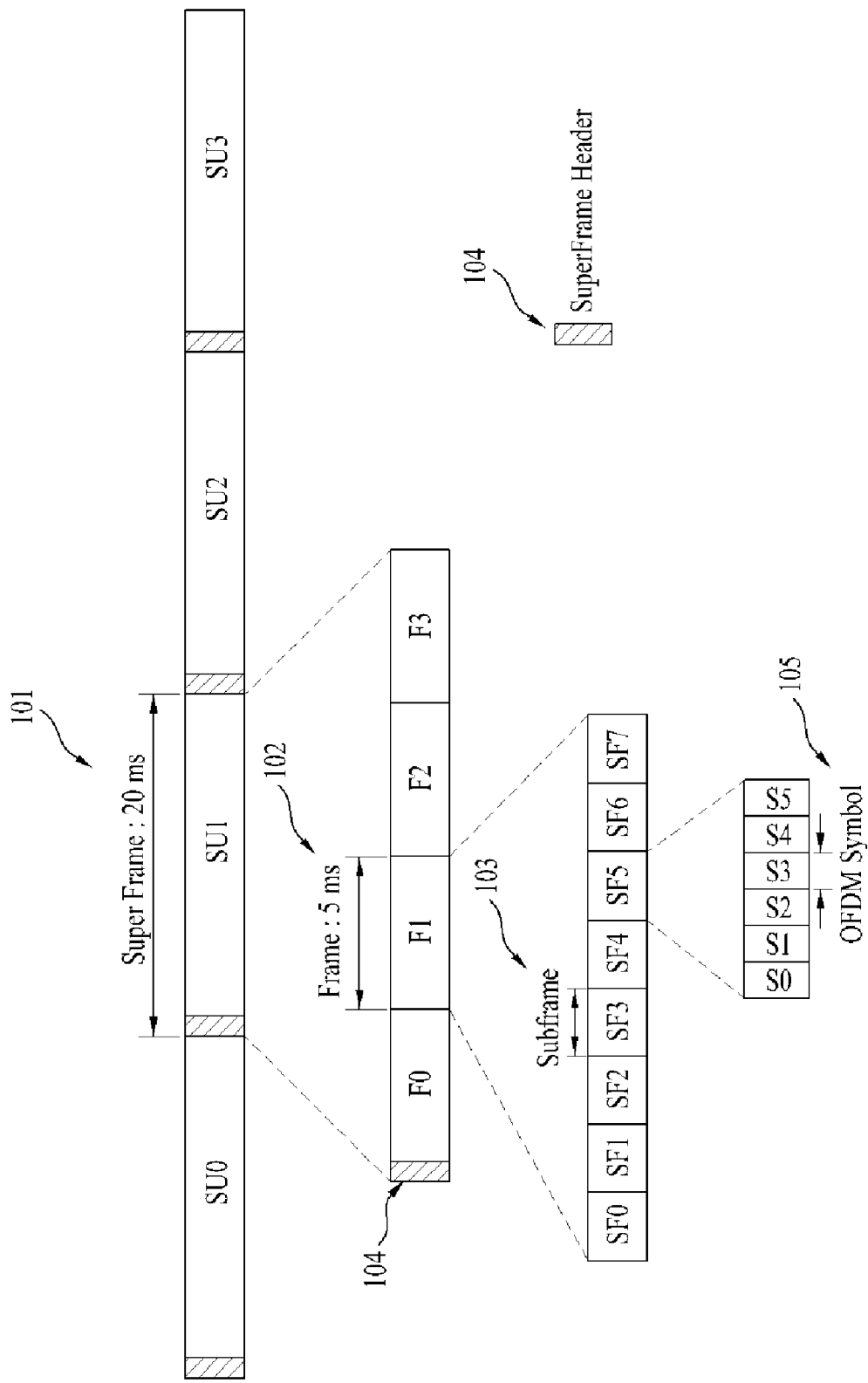
FIG. 1 shows a basic frame structure for the present invention.

FIG. 1 shows a basic frame structure for the present invention.

A super frame 101 is defined in the new system (e.g., 16m system). The super frame 101 indicates a structured data sequence of fixed duration. The super frame 101 may be comprised of four frames 102. The super frame 101 may be 20 ms in time length. Each 20 ms super frame 101 may be divided into four equally-sized 5 ms frames 102. Each 5 ms frame 102 may further consist of eight subframes 103. A subframe 103 is assigned for either downlink (DL) or uplink (UL) transmission.

Referring to FIG. 1, every super frame 101 may include a super frame header (SFH) 104. The SFH 104 may be located in the first downlink (DL) subframe of the super frame, and include broadcast channels. Every subframe may have six OFDM symbols 105 as depicted in FIG. 1, or may have seven OFDM symbols although not shown.

According to one embodiment of the present invention, configuration information indicating which one of TDM and FDM is selected to multiplex 16e MSs and 16m MSs for each uplink frame of a super frame is signaled from a base station (BS) of the new system in a cell to the MSs located in the cell. According to this embodiment, this uplink TDM/FDM (UL TDM/FDM) configuration may be broadcast every super frame or every multiple of a super frame.

The present invention uses a SFH in order to signal which one among TDM and FDM is used in each UL frame of a UL super frame, details of which will be discussed herein after. Generally, the SFH may be transmitted every super frame.

Figure 2:
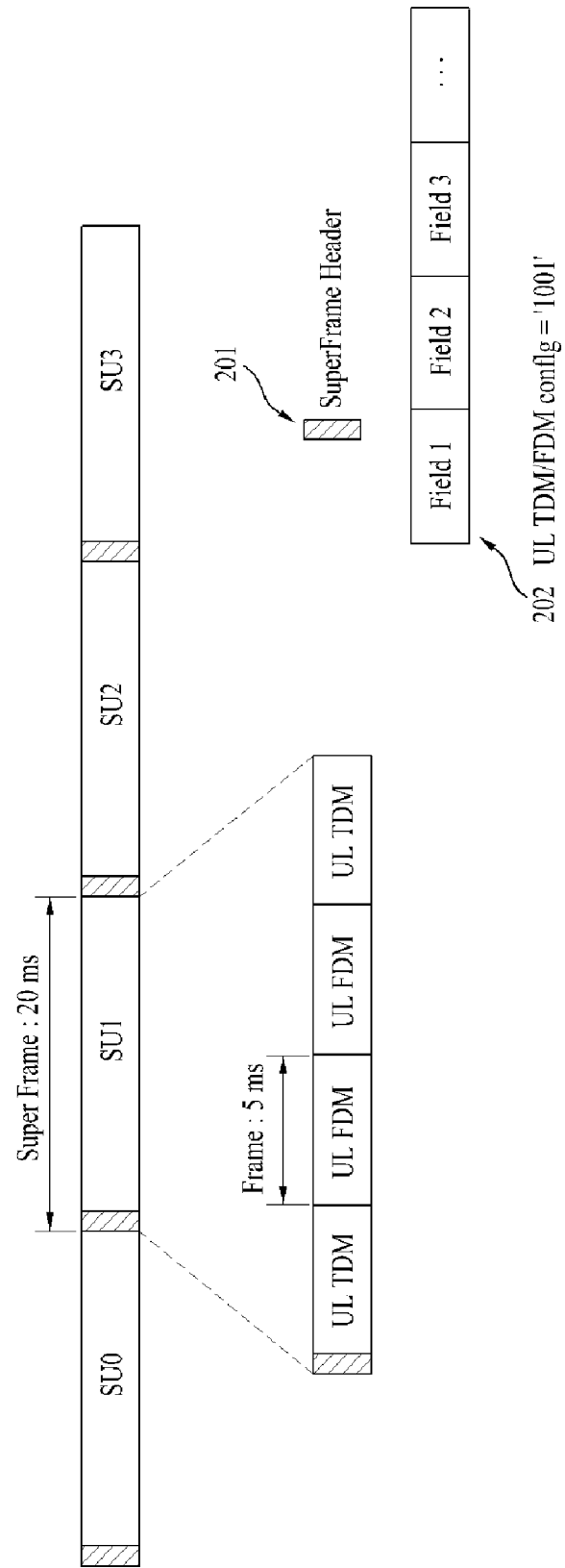
FIG. 2 shows an exemplary UL TDM/FDM configuration of a super frame comprised of four (4) frames according to one embodiment of the present invention.

FIG. 2 shows an exemplary UL TDM/FDM configuration of a super frame comprised of four (4) frames according to one embodiment of the present invention. TDM is selected for the first frame 'F0' and the fourth frame 'F3 ', and FDM is selected for the second frame 'F1 ' and the third frame 'F2 '. The SFH 201 may consist of several fields and this UL TDM/FDM configuration information may be carried in a first field 202 in SFH 201

According to other embodiment of the present invention, the UL system configuration information may be broadcast at a longer period than the time length of a super frame. For example, the UL system configuration information may be broadcast every DCD/UCD interval, which is usually longer than the length of a super frame, or every multiple of DCD/UCD interval. Herein, the DCD refers to a downlink channel descriptor which is a MAC message that describes the PHY characteristics of a downlink, and the UCD refers to an uplink channel descriptor which is a MAC message that describes the PHY characteristics of an uplink, both of which are defined in IEEE Standard 802.16-2004.

According to another embodiment of the present invention, the above discussed UL TDM/FDM configuration information of a frame may be broadcast every frame, carried in a MAP field or the like. According to IEEE Standard 802.16-2004, the UP-MAP defines the uplink usage in terms of the offset of the burst relative to allocation start time.

According to one embodiment of the present invention, above explained UL TDM/FDM configuration information is signaled from one base station (BS) to another BS. With this, one cell can have the knowledge of the UL TDM/FDM configuration information of the other cell. Knowing other cell's UL TDM/FDM configuration at a certain frame, inter-cell confliction can be avoided.

Considering signaling overhead and power consumption, it is desirable for a cell to share the UL TDM/FDM configuration information with another cell via backbone signaling. However, air-interface signaling also can be considered between two cells. The UL TDM/FDM configuration information between two cells can be transmitted at a period of the time length of a super frame or at a period of a multiple of the time length of a super frame.

According to the present invention, in addition to the UL TDM/FDM configuration information, the SFH may include at least one of three (3) system configuration parameters, that is, a downlink-to-uplink ratio (a DL:UL ratio), a 16e-to-16m ratio (16e:16m ratio) for downlink, and a 16e:16m ratio for uplink. Each parameter may be independently signaled from a BS to a MS in a cell every super frame or every multiple of a super frame. Therefore, the parameters may have the same signaling period or may have different signaling periods, respectively. Once these system configuration parameters are signaled to MSs in a cell, the MSs may operate based on these parameters until next signaling of changed parameters.

In this case, it is beneficial to set the DL:UL ratio to a single fixed value for every frame included in a super frame in consideration of signaling overhead, HARQ, etc. Therefore, it is preferable to signal a single value of DL:UL ratio for a super frame. However, it should be noted that the DL:UL ratio can be different from one super frame to another super frame.

Figure 3:
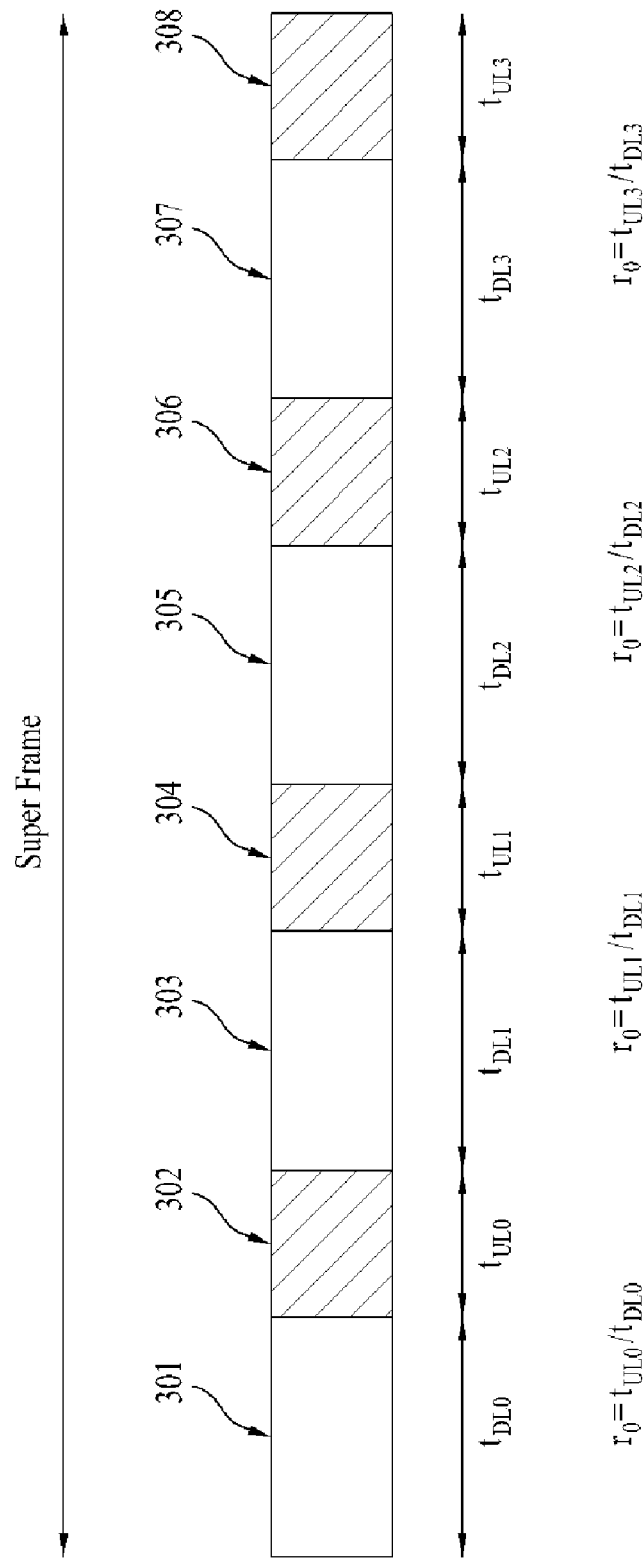
FIG. 3 shows an exemplary super frame structure explaining downlink to uplink ratio according to one embodiment of the present invention.

FIG. 3 shows an exemplary super frame structure explaining downlink-to-uplink ratio according to one embodiment of the present invention.

Referring to FIG. 3, the super frame is composed of four (4) frames. The four (4) frames have downlink resource areas 301, 303, 305, and 307 and uplink resource areas 302, 304, 306, and 308, respectively. In FIG. 3, $t_{DLx}$ indicates the time length of downlink area of x-th frame, and $t_{ULx}$ indicates the time length of uplink area of x-th frame (x=1, 2, 3, or 4). The downlink to uplink ratio is given as $r_x = t_{ULx}/t_{DLx}$ for x-th frame. The value of $r_x$ may be different for different x in the super frame. However, as mentioned above, it is preferable to set the value $r_x$ to a single fixed value for all x in a super frame, which means $r_1=r_2=r_3=r_4$. Also, it can be easily understood that the fixed value of UL:DL ratio can change from a super frame to another super frame.

For a 16e:16m ratio, it is beneficial to set the 16e:16m ratio to a single fixed value for every frame contained in a super frame in consideration of only signaling overhead, HARQ, etc. However, also taking multiplexing granularity of 16m and 16e into account, it is beneficial to set the value of the 16e:16m ratio of a frame using TDM (i.e., a TDM frame) separately with the value of the 16e:16m ratio of a frame using FDM (i.e., a FDM frame). Therefore, preferably, in a single super frame, a single value may be set for the 16e:16m ratio for TDM frames in the single super frame, and another single value may be set for the 16e:16m ratio of FDM frames in the same single super frame.

Figure 4:
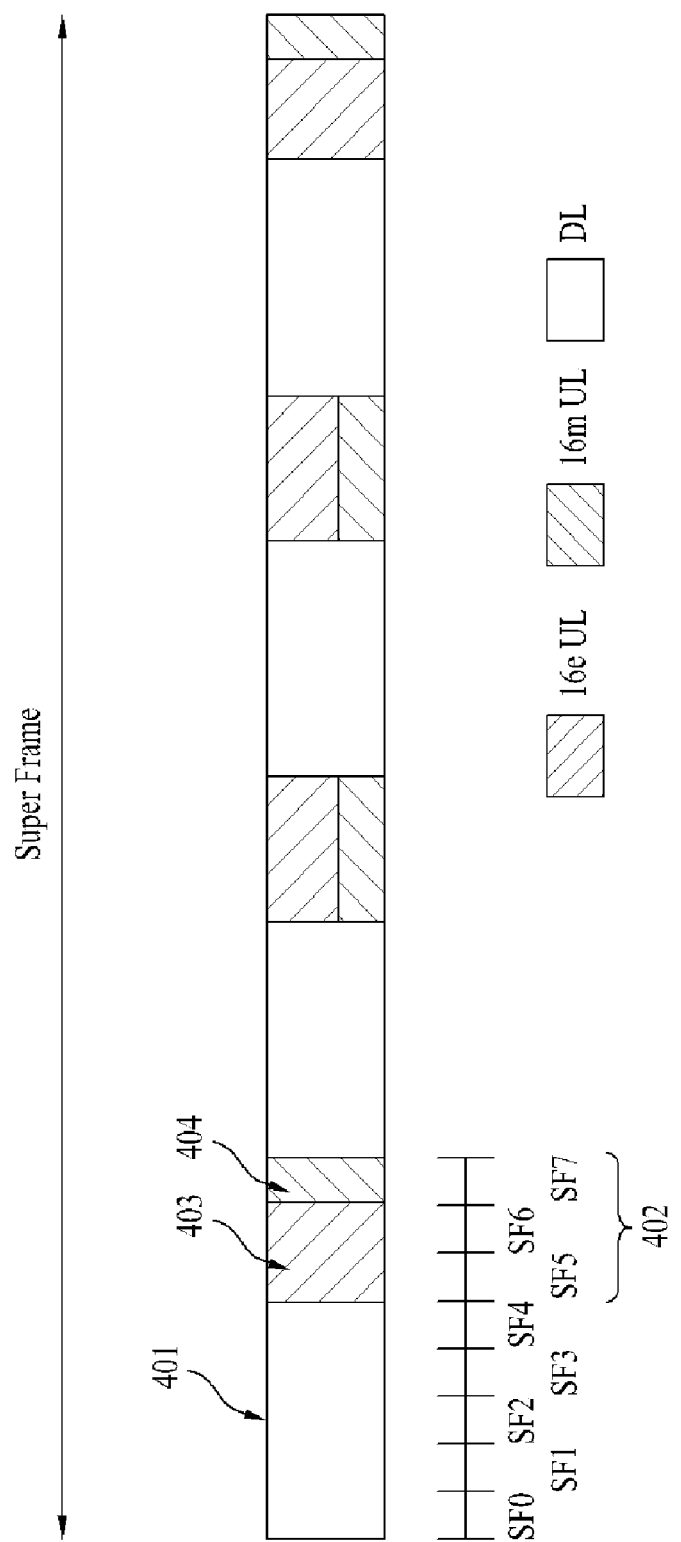
FIG. 4 shows an exemplary super frame structure explaining 16e to 16m ratio according to one embodiment of the present invention.

FIG. 4 shows an exemplary super frame structure explaining 16e to 16m ratio according to one embodiment of the present invention.

Referring to FIG. 4, the super frame consists of four (4) frames, and a frame consists of eight (8) subframes. For the first frame 401, the downlink resource area is composed of first five (5) subframes SF0, SF1, SF2, SF3, and SF4, and the uplink resource area 402 is composed of last three (3) subframes SF5, SF6, and SF7. The uplink resource area is composed of resource area 403 for 16e MSs and resource area 404 for 16m MSs.

For the present invention, it is assumed that total k number of OFDM symbols constitutes a subframe. In this case, time division multiplexing (TDM) of 16e resources and 16m resources can be performed in units of a subframe, in other words, the granularity for TDM of 16e and 16m may be set to a subframe. Generally, the number of subframes in the uplink resource area of a frame is less than eight (8). In this case, the number of cases of the multiplexing ratio is relatively small, thus the number of bits required to signal the TDM ratio of 16e and 16m is small. For example, if the number of subframes in the uplink resource area of a frame is 3 as shown in FIG. 4, 16e:16m may have one of four (4) values, 0:3, 1:2, 2:1, and 3:0, thus, the number of bits required to signal the TDM ratio becomes two (2). Generally, it is preferable to locate the resource area 403 for 16e MSs prior to the resource area 404 for 16m MSs in a TDM frame.

On the other hand, frequency division multiplexing (FDM) of 16e resource and 16m resources can be performed in units of a resource unit (RU), or in units of a multiple of a RU, in other words, the granularity for FDM of 16e and 16m may be set to a RU or a multiple of a RU. Usually, the number of RUs included in a subframe is relatively greater than the number of subframes included in a frame, thus the number of bits required to signal the 16e:16m ratio for UL FDM is greater than the number of bits required to signal the 16e:16m ratio for UL TDM. As mentioned above, it is preferable to set the 16e:16m ratio for UL FDM to a single fixed value for all FDM frames in a super frame, and to set the 16e:16m ratio for UL TDM to a single fixed value for all TDM frames in the super frame independently with the 16e:16m ratio for UL FDM.

For FDM, given a specific 16e:16m ratio for UL FDM, it is preferable to predefine the resource area for 16e MSs and the resource area for 16m MSs, and to assume that a BS and MSs in a cell commonly have the knowledge of the predefined areas for 16e and 16m MSs for that given 16e:16m ratio for UL FDM. In addition, for FDM, it is beneficial, in terms of signaling overhead, to select a 16e:16m ratio for UL FDM from a set of ratios determined based on the conventionally used logical (or physical) subchannel number because logical subchannelization is performed based on a specific permutation rule, such as conventionally used PUSC and AMC scheme. For an example, if n bits are used to specify a 16e:16m ratio for UL FDM, the granularity for FDM may become {(total number of subchannels)/(2^n)} subchannels. In this case, the logical (or physical) subchannel indexes may be increasingly or decreasingly assigned for 16e MSs or 16m MSs.

Above discussed multiplexing information parameters may be defined and signaled separately for TDM and FDM. Alternatively, it can be easily understood that a set of multiplexing information parameters is defined and signaled commonly for TDM frames and FDM frames, but differently interpreted in TDM and FDM frames.

According to one embodiment of the present invention, TDM frames and FDM frames in a super frame may be specified by bitmap indication. For this embodiment, it is assumed that N frames constitute a super frame, n subframes constitute a frame, and the number of unit resource blocks in a subframe is m.

A total of N bits are required to indicate UL TDM/FDM configuration by a bitmap. In this case, a bit of value 1 may indicate that the frame corresponding to this bit is allocated for FDM (or TDM). On the other hand, a bit of value 0 may indicate that the frame corresponding to this bit is allocated for TDM (or FDM). For example, supposing N=4, a 4 bit bitmap of '1001 ' indicates that the first and the fourth frame is for UL TDM, and the second and the third frame is for UL FDM as shown in FIG. 2.

According to other embodiment of the present invention, supposing that only one of TDM and FDM scheme is used for all frames in a super frame, only 1-bit field is required to specify the multiplexing scheme for the super frame, instead of using N-bit bitmap to individually indicate the N corresponding frames.

When a frame consists of n subframes and the granularity for allocating downlink and uplink resources is one subframe, a maximum of ceil(log 2(n)) bits are required for a DL:UL ratio signaling. For example, if n=8, a maximum of 3 bits are required for a DL:UL ratio signaling.

If a DL:UL ratio is given to a fixed ratio x:y, a maximum of ceil(log 2(n*y/(x+y))) bits are required for a 16e:16m ratio signaling for UL TDM, additionally to the maximum of ceil (log 2(n)) bits for a DL:UL ratio signaling. For example, if n=8 and DL:UL=5:3, then a maximum of 2 bits are required for a 16e:16m ratio signaling for UL TDM.

On the other hand, it can be easily understood that a maximum of ceil(log 2(m)) bits are required for a 16e:16m ratio signaling for UL FDM. For example, if m=48, a maximum of 6 bits are required for a 16e:16m ratio signaling for UL FDM.

According to another embodiment of the present invention, the number of bits required for 16e:16m ratio signaling for UL TDM is equal to the number of bits required for 16e:16m ratio signaling for UL FDM. When this number is given by k, it can be recognized that a total of 2^k subframes are allocated for UL TDM. On the other hand, a part of the total subchannels of a frame is allocated for 16e and the other part for or 16m according to the number k for FDM. For example, if k=2, then the signaling bits of '01', '10 ', '11 ', and '00 ' may indicate that 1/4, 2/4, 3/4, and 4/4 of total subchannels are allocated for 16e, and 3/4, 2/4, 1/4, and 0/4 of the total subchannels are allocated for 16m, respectively.

As discussed above, the system configuration information may include at least UL FDM/TDM configuration and the above explained parameters. Each of the system configuration information may be transmitted individually. Further, considering the transmission period and signaling overhead, the system configuration information can first be reformed into a table or a pattern and then an index of the table or the pattern can be transmitted.

Figure 5:
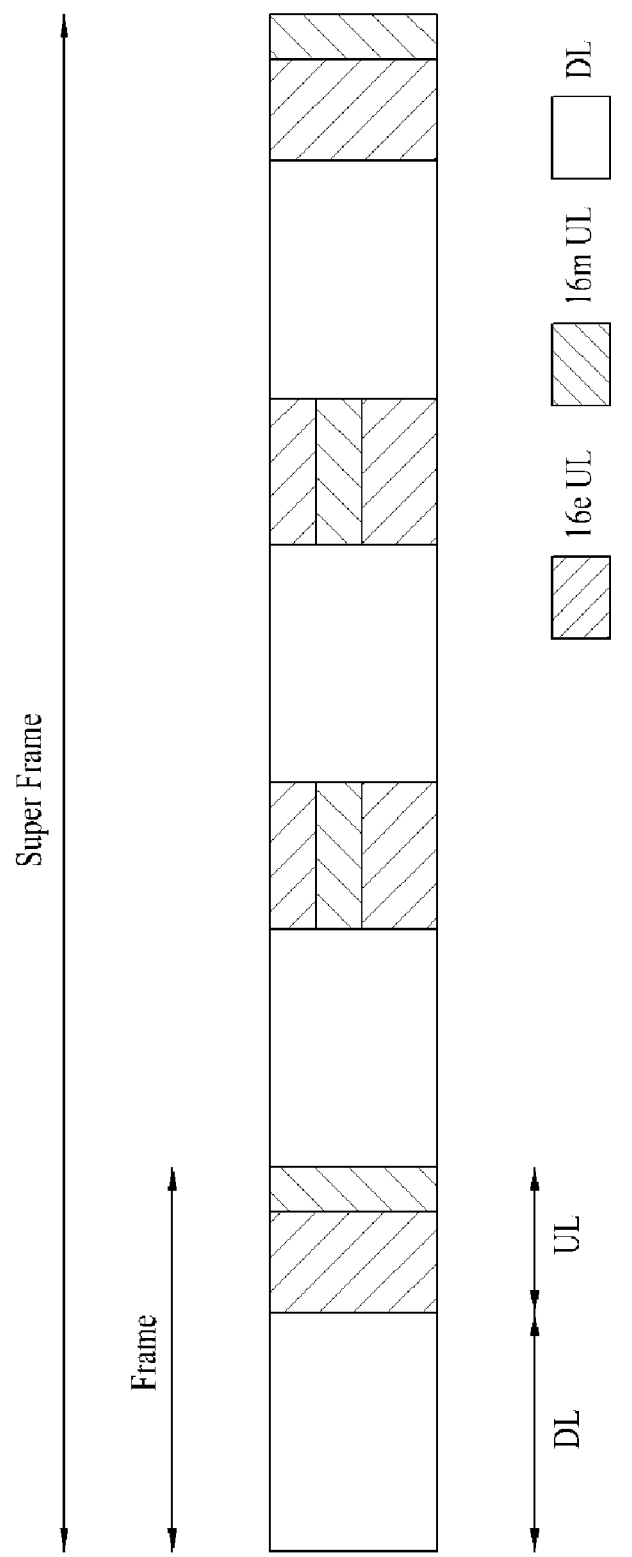
FIG. 5 shows an exemplary super frame structure according to the present invention.

FIG. 5 shows an exemplary super frame structure according to the present invention. FIG. 5 shows a case of N=4, n=8, DL:UL=5:3, 16e:16m=2:1 for TDM frame, 16e:16m=3:1 for a FDM frame, and UL TDM/FDM bitmap='1010'.

According to one embodiment of the present invention, the system configuration is determined in consideration of the coverage of VoIP which is transmitted every 20 ms.

Figure 6:
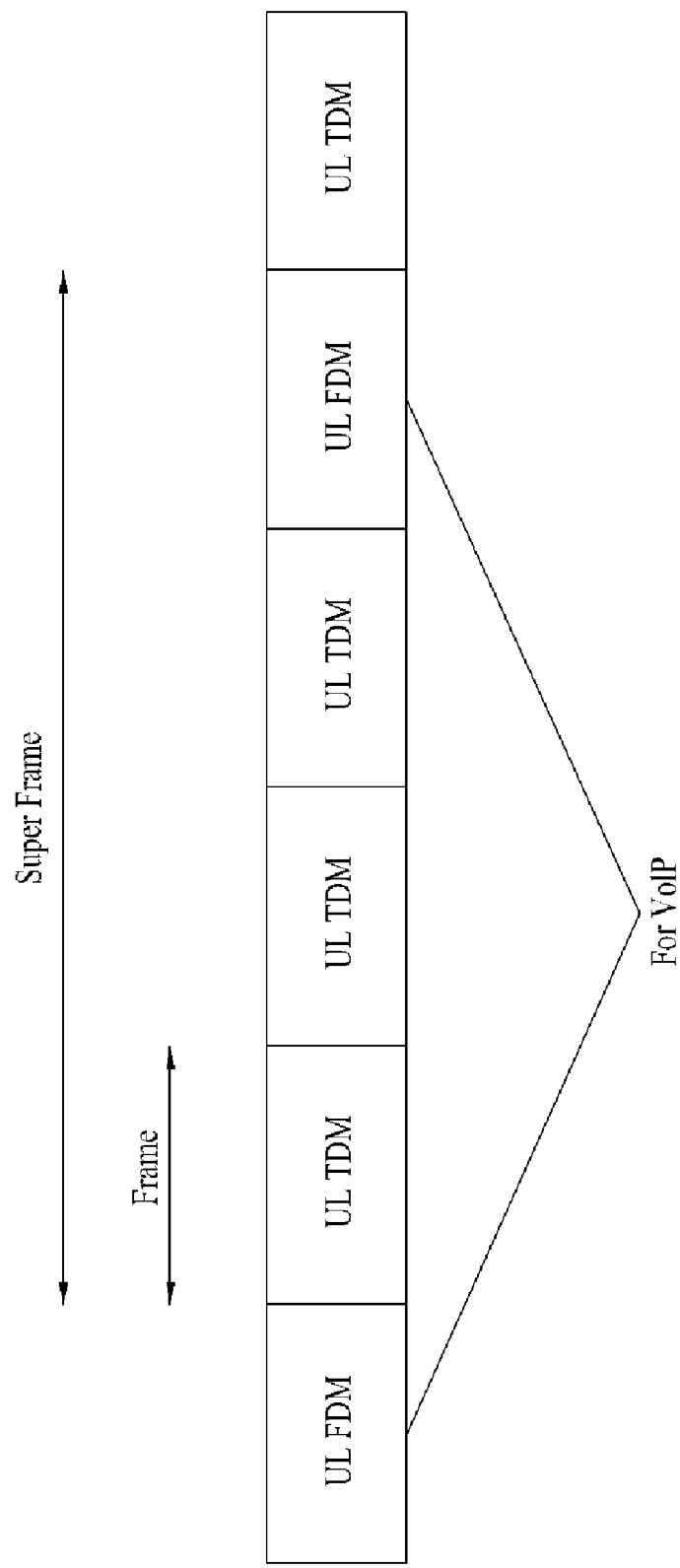
FIG. 6 shows an exemplary super frame structures considering VoIP coverage according to one embodiment of the present invention.

FIG. 6 shows an exemplary super frame structures considering VoIP coverage according to one embodiment of the present invention.

Referring to FIG. 6, every super frame has an UL FDM frame in a specific fixed position within the super frame. For example, as shown in FIG. 6, an UL FDM frame is sent every 20 ms, which is coincident with the VoIP service period. Because the time length of a super frame is the same as the period of the VoIP transmission in this case, the UL FDM frame is located in a specific fixed position (e.g., the last frame of each super frame) for all super frames.

The above embodiments are disclosed on the basis of a data communication relationship between the transmission end (e.g., Node-B) and the reception end (e.g., UE). In this case, the Node-B is used as a terminal node of a network via which the Node-B can directly communicate with the user equipment (UE).

The term "Base Station" may be replaced with a fixed station, Node-B, eNode-B (eNB), or an access point as necessary. The mobile station (MS) may also be replaced with a user equipment (UE) or a mobile subscriber station (MSS) as necessary.

The above embodiments of the present invention can be implemented by hardware, firmware, software, or a combination of them. In the case of implementing the present invention by hardware, the present invention can be implemented with ASICs (application specific integrated circuits), DSPs (Digital signal processors), DSPDs (digital signal processing devices), PLDs (programmable logic devices), FPGAs (field programmable gate arrays), a processor, a controller, a microcontroller, or a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention can be applied for a communication device in a wireless mobile cellular communication system.

The invention claimed is:

1. A method for, at a base station, transmitting system configuration information for a wireless mobile communication system supporting uplink multiplexing of a first type mobile station (MS) and a second type mobile station (MS), the method comprising:
transmitting the system configuration information in a super frame header at a first period, the first period comprised of a plurality of super frames, the super frame comprised of a plurality of frames,
wherein the system configuration information comprises a configuration index used for indicating whether time division multiplexing (TDM) or frequency division multiplexing (FDM) is used for multiplexing of uplink resource for the first type MS and uplink resource for the second type MS in a frame, and
wherein the configuration index is further used for indicating number of uplink subframe(s) for the second type MS among uplink subframes in the frame; and
transmitting, at a second period, information about available uplink subchannel(s) for the first type MS in the frame when FDM is used.

2. The method of claim 1, wherein the time length of the super frame is 20 ms, and the super frame is comprised of four (4) frames, each frame being 5 ms in time length.

3. The method of claim 1, wherein the system configuration information further comprises a ratio of an amount of resources for the first type MS to an amount of resources for the second type MS for each frame of the period.

4. The method of claim 3, wherein the ratio is set to a single fixed value for each frame of the period.

5. The method of claim 3, wherein the ratio is independently set for each frame of the period.

6. The method of claim 3, wherein the ratio is set to a first value for all frames for FDM in each frame of the period, and the ratio is set to a second value for all frames for TDM in each frame of the period.

7. The method of claim 1, wherein the system configuration information is represented by a bitmap format.

8. The method of claim 1, wherein the system configuration information is represented in a table form.

9. The method of claim 1, wherein the system configuration information is transmitted to a mobile station in a cell including the base station.

10. The method of claim 1, wherein the system configuration information is transmitted to a network entity of another cell.

11. The method of claim 1, wherein the system configuration information further comprises downlink-to-uplink resource ratio in each super frame of the period, and the downlink-to-uplink resource ratio is represented by ceil(log2(n1)) bits when the frame is comprised of n1 number of subframes.

12. The method of claim 11, wherein the system configuration information further comprises an uplink configuration of time division multiplexing (TDM) of the first type MS and the second type MS of a frame, and the unlink configuration is represented by ceil(log2(n2*y/(x+y)) bits when the downlink-to-uplink resource ratio is given by x:y and the uplink area of the frame is comprised of n2 number of subframes.

13. A method for, at a base station, transmitting system configuration information for a wireless mobile communication system supporting uplink multiplexing of a first type mobile station (MS) and a second type mobile station (MS), the method comprising:
transmitting the system configuration information at a period of a time length of a frame, the time length of the frame being 5 ms,
wherein the system configuration information comprises a configuration index used for indicating whether time division multiplexing (TDM) and frequency division multiplexing (FDM) is used for multiplexing of uplink resource for the first type MS and uplink resource for the second type MS in a frame, and
wherein the configuration index is further used for indicating number of uplink subframe(s) for the second type MS among uplink subframes in the frame; and
transmitting, at a second period, information about available uplink subchannel(s) for the first type MS in the frame when FDM is used.

14. The method of claim 13, wherein the system configuration information is written in UP-MAP field of the frame.

* * * * *